US008819025B2

(12) United States Patent
De Bona et al.

(10) Patent No.: US 8,819,025 B2
(45) Date of Patent: Aug. 26, 2014

(54) RECOMMENDING APPLICATIONS FOR MOBILE DEVICES BASED ON INSTALLATION HISTORIES

(75) Inventors: Fabio De Bona, Adliswil (CH); Bhaskar Mehta, Adliswil (CH)

(73) Assignee: Google Inc., Mountain View, CA (US)

( * ) Notice: Subject to any disclaimer, the term of this patent is extended or adjusted under 35 U.S.C. 154(b) by 4 days.

(21) Appl. No.: 13/530,559

(22) Filed: Jun. 22, 2012

(65) Prior Publication Data

US 2012/0290584 A1 Nov. 15, 2012

Related U.S. Application Data

(63) Continuation of application No. PCT/US2012/037116, filed on May 9, 2012.

(60) Provisional application No. 61/484,125, filed on May 9, 2011.

(51) Int. Cl.
*G06F 17/30* (2006.01)

(52) U.S. Cl.
USPC ........... 707/741; 707/740; 707/752; 707/767; 707/768

(58) Field of Classification Search
CPC ................................. G06F 17/30; G06F 17/00
See application file for complete search history.

(56) References Cited

U.S. PATENT DOCUMENTS

| | | | |
|---|---|---|---|
| 4,977,598 A | 12/1990 | Doddington et al. | |
| 6,185,543 B1 * | 2/2001 | Galperin et al. | 705/38 |
| 6,675,382 B1 | 1/2004 | Foster | |
| 6,925,649 B2 * | 8/2005 | Schwalb et al. | 725/32 |
| 7,073,190 B1 * | 7/2006 | Malaure et al. | 725/61 |
| 7,113,917 B2 | 9/2006 | Jacobi et al. | |
| 7,130,734 B2 * | 10/2006 | Sah et al. | 701/67 |
| 7,523,099 B1 | 4/2009 | Egnor et al. | |
| 7,555,459 B2 * | 6/2009 | Dhar et al. | 705/38 |

(Continued)

FOREIGN PATENT DOCUMENTS

| | | |
|---|---|---|
| EP | 2230605 A1 | 9/2010 |
| WO | WO2012154838 A2 | 11/2012 |

(Continued)

OTHER PUBLICATIONS

Authorized Officer D. Van Rijssel. International Search Report in International Application No. PCT/US/2012/037129, dated Jul. 23, 2012, 9 pages.

(Continued)

*Primary Examiner* — Farhan Syed
(74) *Attorney, Agent, or Firm* — Fish & Richardson P.C.

(57) ABSTRACT

Methods, systems, and apparatus, including computer programs encoded on a computer storage medium, for receiving installation data, the installation data corresponding to one or more applications that can be installed and executed on mobile computing devices, receiving metadata corresponding to each of the one or more applications, for each application: generating a time series based on a number of installs, processing the time series and the metadata, calculating a score, determining that the score is greater than or equal to a threshold score, and in response to the determining, adding the respective application to an index of trending applications, storing the index of trending applications in computer-readable memory, retrieving the index of trending applications, and transmitting indications of one or more applications for display based upon the index of trending applications.

19 Claims, 5 Drawing Sheets

(56) References Cited

U.S. PATENT DOCUMENTS

| | | | |
|---|---|---|---|
| 7,594,006 B2 * | 9/2009 | Rolia et al. | 709/223 |
| 7,644,013 B2 * | 1/2010 | Nastacio et al. | 705/26.1 |
| 7,685,012 B2 * | 3/2010 | Wilson | 705/7.24 |
| 7,792,685 B2 * | 9/2010 | Andino et al. | 705/1.1 |
| 7,831,695 B1 * | 11/2010 | Burr et al. | 709/220 |
| 7,890,870 B1 * | 2/2011 | Metters et al. | 715/736 |
| RE42,357 E * | 5/2011 | Malaure et al. | 725/61 |
| 7,945,545 B1 * | 5/2011 | Sorkin et al. | 707/705 |
| 8,169,481 B2 * | 5/2012 | Ozdemir et al. | 348/155 |
| 8,175,802 B2 * | 5/2012 | Forstall et al. | 701/424 |
| 8,245,239 B2 * | 8/2012 | Garyali et al. | 718/107 |
| 2002/0063735 A1 * | 5/2002 | Tamir et al. | 345/745 |
| 2002/0144261 A1 * | 10/2002 | Schwalb et al. | 725/32 |
| 2002/0152200 A1 | 10/2002 | Krichilsky et al. | |
| 2002/0194096 A1 * | 12/2002 | Falcone et al. | 705/35 |
| 2003/0192029 A1 * | 10/2003 | Hughes | 717/101 |
| 2004/0093595 A1 * | 5/2004 | Bilange | 717/171 |
| 2004/0143508 A1 | 7/2004 | Bohn et al. | |
| 2005/0091094 A1 * | 4/2005 | Wilson | 705/7 |
| 2005/0120113 A1 * | 6/2005 | Bunch et al. | 709/224 |
| 2005/0240668 A1 * | 10/2005 | Rolia et al. | 709/223 |
| 2006/0031248 A1 | 2/2006 | Vinberg et al. | |
| 2006/0271618 A1 | 11/2006 | Kokubo et al. | |
| 2007/0208583 A1 * | 9/2007 | Ward | 705/1 |
| 2007/0233782 A1 | 10/2007 | Tali | |
| 2009/0163183 A1 | 6/2009 | O Donoghue et al. | |
| 2009/0276332 A1 * | 11/2009 | Gharabally et al. | 705/27 |
| 2010/0011352 A1 | 1/2010 | Chu et al. | |
| 2010/0042616 A1 | 2/2010 | Rinearson | |
| 2010/0058468 A1 | 3/2010 | Green et al. | |
| 2010/0076849 A1 * | 3/2010 | Bishop | 705/14.64 |
| 2010/0146442 A1 | 6/2010 | Nagasaka et al. | |
| 2010/0250337 A1 | 9/2010 | Kassaei | |
| 2010/0262467 A1 * | 10/2010 | Barnhill et al. | 705/10 |
| 2010/0262619 A1 | 10/2010 | Zargahi et al. | |
| 2010/0280892 A1 * | 11/2010 | Uzunalioglu et al. | 705/14.13 |
| 2010/0306191 A1 | 12/2010 | LeBeau et al. | |
| 2010/0306762 A1 | 12/2010 | Lindberg et al. | |
| 2010/0312817 A1 | 12/2010 | Steakley | |
| 2011/0077951 A1 | 3/2011 | Tullis | |
| 2011/0087975 A1 | 4/2011 | Karsten | |
| 2011/0105150 A1 * | 5/2011 | Moon et al. | 455/456.3 |
| 2011/0106775 A1 | 5/2011 | Arbo et al. | |
| 2011/0145920 A1 * | 6/2011 | Mahaffey et al. | 726/22 |
| 2011/0167117 A1 * | 7/2011 | Hart et al. | 709/206 |
| 2011/0307354 A1 | 12/2011 | Erman et al. | |
| 2011/0320307 A1 * | 12/2011 | Mehta et al. | 705/26.7 |
| 2012/0072283 A1 * | 3/2012 | DeVore et al. | 705/14.49 |
| 2012/0290441 A1 | 11/2012 | Mahaniok et al. | |
| 2012/0290583 A1 | 11/2012 | Mahaniok et al. | |
| 2012/0291022 A1 | 11/2012 | Mehta et al. | |
| 2012/0316955 A1 * | 12/2012 | Panguluri et al. | 705/14.41 |
| 2013/0268397 A1 | 10/2013 | Mehta | |
| 2014/0019442 A1 | 1/2014 | Mahaniok | |

FOREIGN PATENT DOCUMENTS

| | | | |
|---|---|---|---|
| WO | WO2012154843 A1 | 11/2012 | |
| WO | WO2012154848 A1 | 11/2012 | |
| WO | WO2012154856 A1 | 11/2012 | |
| WO | WO2013169245 A2 | 11/2013 | |

OTHER PUBLICATIONS

Authorized Officer E. Sagno-Pabis. International Search Report in International Application No. PCT/US2012/037116, dated Jul. 11, 2012, 11 pages.

Authorized Officer D. Van Rijssel. International Search Report in International Application No. PCT/US2012/037109, dated Jul. 23, 2012, 9 pages.

Cutler; "Apple May have Tweaked App Store Ranking Algorithm, Making Downloads Matter Less," Apr. 18, 2011. [Retrieved on Jun. 29, 2012]. Retrieved from the Internet: URL: http://www.insidemobileapps.com/2011/04/18/apple-app-store-ranking-changes, 6 pages.

Peck, "What is the algorithm behind the App Store rankings," Oct. 27, 2010. [Retrieved on Jun. 29, 2012]. Retrieved from the Internet: URL: http://www.quora.com/What-is-the algorithm-behind-the-App-Store-rankings, 2 pages.

Ihar Mahaniok et al., U.S. Appl. No. 13/530,539, entitled "Using Application Metadata to Identify Applications of Interest," filed Jun. 22, 2012, 40 pages. (including specification, claims, abstract and drawings).

Ihar Mahaniok et al., U.S. Appl. No. 13/530,242, entitled "Using Application Market Log Data to Identify Applications of Interest," filed Jun. 22, 2012, 39 pages. (including specification, claims, abstract and drawings).

Bhaskar Mehta et al., U.S. Appl. No. 13/530,204, entitled "Generating Application Recommendations Based on User Installed Applications," filed Jun. 22, 2012, 40 pages. (including specification, claims, abstract and drawings).

Authorized Officer Lingfei Bai. International Preliminary Report on Patentability in International Application No. PCT/US2012/037109, dated Nov. 21, 2013, 6 pages.

Authorized Officer Nora Lindner. International Preliminary Report on Patentability in International Application No. PCT/US2012/037129, dated Nov. 21, 2013, 6 pages.

Authorized Officer Kihwan Moon. International Preliminary Report on Patentability in International Application No. PCT/US2012/037100, dated Nov. 21, 2013, 7 pages.

Authorized Officer Philippe Becamel. International Preliminary Report on Patentability in International Application No. PCT/US2012/037116, dated Nov. 21, 2013, 6 pages.

Authorized Officer Blaine R. Copenheaver, International Search Report and Written Opinion in International Application No. PCT/US2012/037122, dated Jan. 4, 2013, 12 pages.

Authorized Officer Jung Soo Hwan, International Search Report and Written Opinion in International Application No. PCT/US2012/037100, dated Feb. 19, 2013, 11 pages.

Roush, Wade, Search Beyond Google. Technology Review 107.2 (Mar. 2004): 34-45. Downloaded from ProQuestDirect on the Internet on Jan. 13, 2013, 5 pages.

* cited by examiner

US 8,819,025 B2

RECOMMENDING APPLICATIONS FOR MOBILE DEVICES BASED ON INSTALLATION HISTORIES

PRIORITY CLAIM

This application is a continuation of, and claims priority to under 35 U.S.C. 120, International Application No. PCT/US2012/037116, filed May 9, 2012, which in turn claims the benefit of U.S. Prov. Patent App. No. 61/484,125, filed on May 9, 2011, the disclosures of which are expressly incorporated herein by reference in their entirety.

TECHNICAL FIELD

The present disclosure relates to recommending one or more applications for installation on a mobile computing device.

BACKGROUND

Mobile computing devices (or simply "mobile devices") may run a variety of software applications that extend existing device capabilities and that add new capabilities. Many types of applications are generally available, such as applications for information retrieval, communications and entertainment. Applications may be created by mobile device manufacturers and/or third parties (e.g., application developers), and may be pre-installed by the manufacturer, or may be downloaded and installed by device users.

Users may discover new applications through an interface associated with an on-line application marketplace, by browsing a catalog of available applications. Additionally, information about new applications is generally available through advertising, industry reviews, "top 10" and "best" lists, and through word-of-mouth referrals. Upon learning of a new application, users may obtain, install, and use full versions of the applications, or user may access demonstration versions of the application that allow the user to try the application out with or without purchasing. Over time, users may keep applications, upgrade applications (e.g., from a demonstration version to a full version), and may delete applications that are no longer wanted.

SUMMARY

Innovative aspects of the subject matter described in this specification may be embodied in methods that include the actions of receiving installation data, the installation data corresponding to one or more applications that can be installed and executed on mobile computing devices, receiving metadata corresponding to each of the one or more applications, for each application: generating a time series based on a number of installs, processing the time series and the metadata, calculating a score, determining that the score is greater than or equal to a threshold score, and in response to the determining, adding the respective application to an index of trending applications, storing the index of trending applications in computer-readable memory, retrieving the index of trending applications, and transmitting indications of one or more applications for display based upon the index of trending applications Other embodiments of these aspects include corresponding systems, apparatus, and computer programs, configured to perform the actions of the methods, encoded on computer storage devices. For example, each time series includes a number of installs per time period for a predetermined number of time periods; the time period is one day and the predetermined number of time periods totals one week; processing the time series includes applying decay factors to modify impacts of time periods in calculating the score; the score is based on a second-order derivative of the time series; for each application, the score is based on a fractional installation volume of the application; the fractional installation volume is determined based on a total number of installations of all applications; the operations further include filtering applications from inclusion in the index of trending applications based on the metadata; filtering is executed prior to generating, processing and calculating for each application; the actions further include filtering applications from inclusion in the index of trending applications based on number of installs; an application is filtered when an associated number of installations is less than a threshold number of installations; filtering is executed prior to generating, processing and calculating for each application; the actions further include filtering applications from inclusion in the index of trending applications based on accelerations over a predetermined time period; an application is filtered when a consecutive number of negative accelerations within the predetermined time period is greater than a threshold number of negative accelerations; an application is filtered when one or more negative accelerations occur within a specified sub-period of the predetermined time period; the actions are periodically executed to periodically update the index of trending applications; the installation data includes a number of installations, a number of uninstallations and a number of updates for each application.

Particular implementations of the subject matter described in this specification may be implemented so as to realize one or more of the following advantages. Implementations of the present disclosure assist users discover interesting applications that may otherwise be difficult to discover through searching, and can assist users with keeping track of what is going on in an application marketplace. Implementations further enable developers to better understand what kind of topics are trendy and generate high download volumes. Further, trending applications can be used as a signal in other products.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
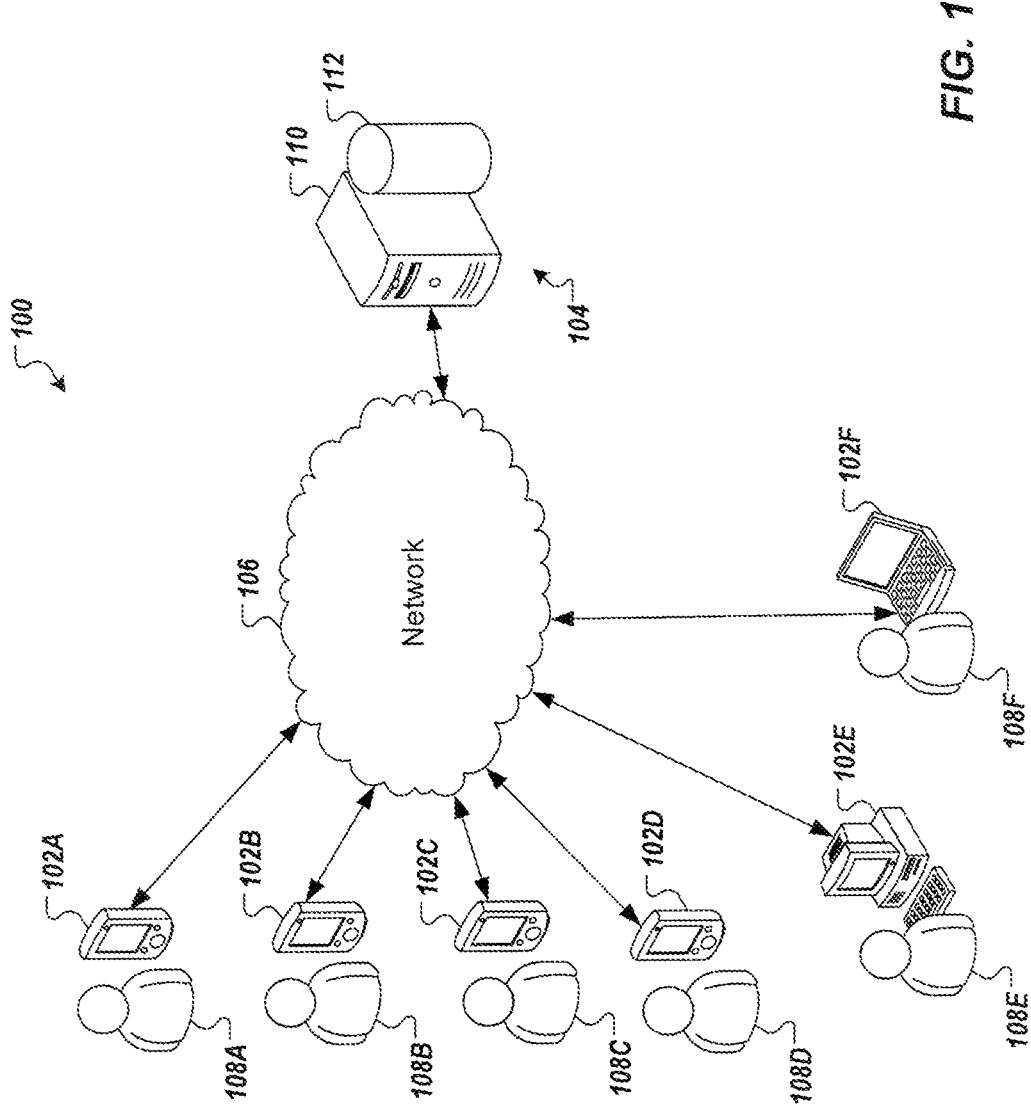
FIG. 1 is a diagram of an example system that can execute implementations of the present disclosure.

This specification describes systems and techniques for identifying trending applications within an application marketplace. In some implementations, users of computing devices (e.g., mobile computing devices) can search for executable applications in the application marketplace and can download and install these applications on the computing devices. However, the users can find it cumbersome to search through the application marketplace to discover applications that are newly released and are relatively unknown, but are beginning to become more popular (i.e., trending applications).

In accordance with implementations of the present disclosure, applications are identified as trending applications based on an acceleration of installations of the application and a volume of installations of the application. Acceleration can be defined as an increase or a decrease of a rate of change in the total number of installations of the application over a time period (e.g., each day). The total number of installations can be provided as the sum of the number of installations of the application and the number of updates of the application minus the number of uninstallations of the application. A positive acceleration indicates an increase in the rate of change of the number of installations of the application over the time period. A negative acceleration indicates a decrease in the rate of change of the number of installations of the application over the time period. The volume of installations of the application can be provided as a percentage of the number of installations of the application compared to the total number of installations of all applications within the application marketplace (e.g., a fractional volume). In some implementations, the fractional volume of the application is a percentage of a subset of the total application marketplace, for example, similar (or related) applications to the application or applications having the same category as the application.

A trending score is generated for each application based on the acceleration and the fractional volume. In an example, the acceleration of the application is calculated for each day over a number of days (e.g. 7 days). A decay factor can be applied to the acceleration of each day. In some implementations, the decay factor increases the further the day is removed from the current day. As a result, less weight is associated with accelerations further in the past from the current day. The accelerations of each day are summed together to define a total acceleration of the application over the time period (e.g. 7 days). The trending score can be defined as the product of the total acceleration and the fractional volume.

An index of trending applications is generated based on the trending scores of the applications. The applications can be ranked in the index of trending applications based on the respective trending scores. For example, the higher a trending score of an application, the higher it is ranked on the index. The index of trending applications can be stored in a database. The index of trending applications can be intermittently updated (e.g., every 6 hours, every day).

In some implementations, the trending score of each application is compared to a threshold score. If the trending score is greater than or equal to the threshold score, the respective application is deemed to be a trending application and is included in the index of trending applications. If the trending score is less than the threshold score, the respective application is not deemed to be a trending application and is not included in the index of trending applications.

In some implementations, a subset of applications can be filtered to remove the subset of applications from possible inclusion in the index of trending applications. Specifically, a trending score is not generated for such applications. As discussed in further detail herein, the subset of applications can include applications, for example, having content such as adult content; applications having less than a minimum number of installs; applications having more than a maximum number of days of having a decreasing installation rate; and the like. In some implementations, such filtering can be executed prior to generating the index of trending applications. In some implementations, the applications can be filtered after generating the index of trending applications such that applications are removed from the index.

FIG. 1 is a diagram of an example system 100 that can execute implementations of the present disclosure. The system 100 includes computing devices 102A-102F that can each communicate with a server system 104 over a network 106. Each of the computing devices 102A-102F includes an associated user 108A-108F, respectively. The network 106 can include a large computer network, such as a local area network (LAN), a wide area network (WAN), the Internet, a cellular network, or a combination thereof connecting any number of mobile computing devices, fixed computing devices, and server systems. The server system 104 includes one or more computing devices 110 and one or more machine-readable repositories, or databases 112. For simplicity of illustration, the server system 104 is shown including one computing device 110 and one machine-readable repository, or database 112.

In the example system 100, the computing devices 102A, 102B, 102C, 102D are illustrated as mobile computing devices, the computing device 102E is illustrated as a desktop-type computing device and the computing device 102F is illustrated as a laptop-type computing device. It is appreciated, however, that the computing devices 102A-102F can each include any type of computing device such as a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

The computing devices 102A-102F enable the respective users 108A-108F to interact with an application marketplace. An example application marketplace includes Google Play (formerly known as the Android Market) provided by Google Inc. In some implementations, the application marketplace can include a website that is hosted on one or more servers (e.g., the server system 104) and that is accessed using a computing device (e.g., computing devices 102A-102F). In some implementations, the application marketplace can be provided as an application that is executed on a computing device (e.g., computing devices 102A-102F), and that retrieves application information from one or more servers (e.g., the server system 104).

The application marketplace can advertise applications that are available for download to and installation on the computing devices 102A-102F. For example, the user 108A of the computing device 102A can interact with the application marketplace to view and/or find applications of interest. For example, the application marketplace can display categories of applications (e.g., most recent, most downloaded, top free applications, top paid applications, featured applications, trending or "hot" applications, entertainment, productivity, business, education and the like). In response to selecting a particular category, information corresponding to one or more applications within the particular category can be transmitted to the computing device 102A for display to the user 108A. As another example, the user 102A can input a search query to the application marketplace. The search query can be processed (e.g., by one or more server systems hosting, or otherwise providing data to the application marketplace) to identify one or more applications corresponding to the search query. Information corresponding to the one or more applications can be transmitted to the computing device 102A for display to the user 108A.

Continuing with the example above, the user 108A can select the trending applications category of applications. The trending applications category includes a listing of applications that are identified as trending applications within the application marketplace. The listing of applications can include display detail such as an application title, a description of the application, an application developer, an application icon, a pricing and a rating. As discussed in further detail below, implementations of the present disclosure are directed to identifying trending applications for inclusion within the trending applications category.

Figure 2:
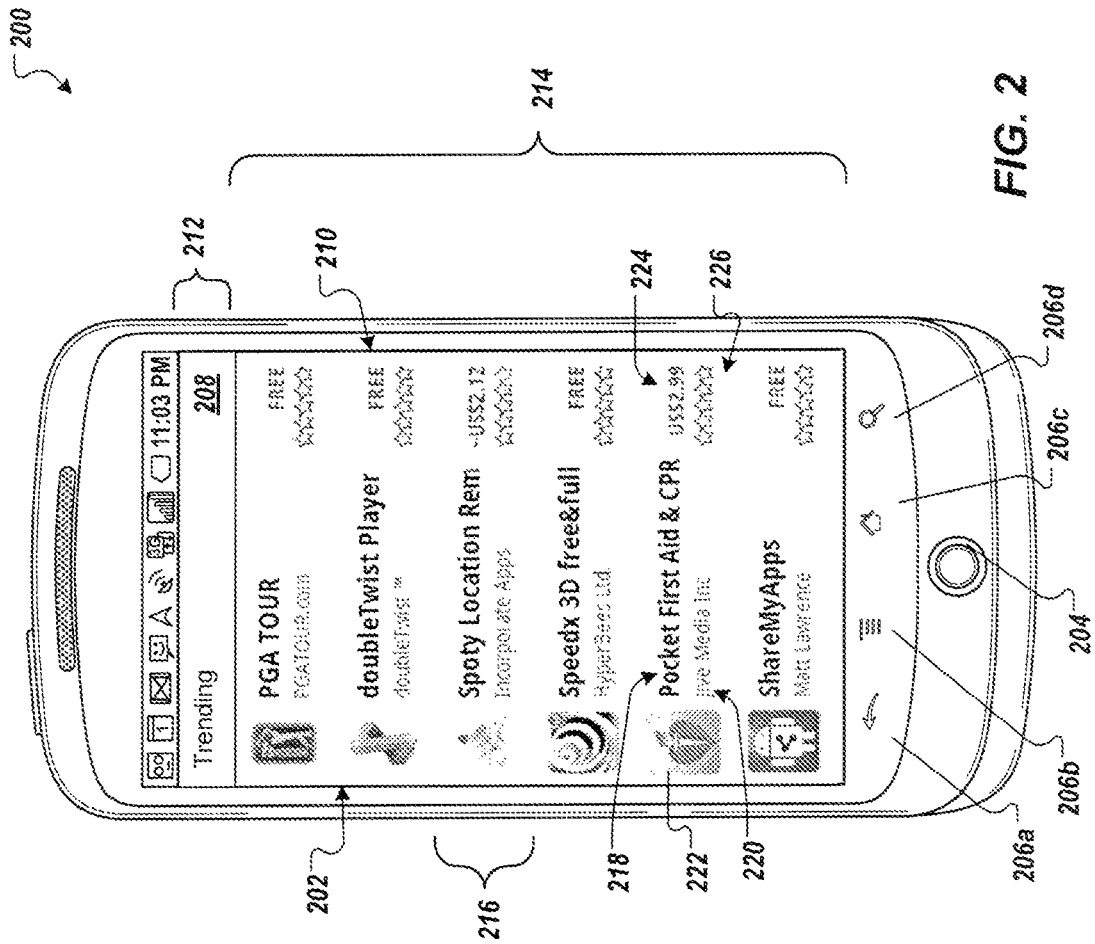
FIG. 2 depicts an example mobile device for displaying a trending applications category.

FIG. 2 depicts an example mobile device 200 for displaying the trending applications category. The mobile device 200 can correspond to the computing devices 102A-102D of FIG. 1. The mobile device 200 includes a display 202, a trackball 204 and navigations buttons 206a-206d. The display 202 displays a graphical user interface (GUI) 208. The GUI 208 provides an interface for a user (e.g., the users 108A-108D) to interact with an operating system and applications stored on a memory of the mobile device 200. An example operating system includes the Android Operating System provided by Google Inc. The user can interact with the GUI 208 to navigate a listing of the applications stored in memory of and executable on the mobile device 200, select an application for execution by a processor of the mobile device 200, provide input to the applications during execution of the application, and the like.

The user of the mobile device 200 navigates the GUI 208 via the display 202, the trackball 204, navigations buttons 206a-206d, and/or other input means (e.g., acoustic and/or tactile). In some implementations, the display 202 is a touchscreen display. The trackball 204 controls a cursor that can be part of the GUI 208 for selecting items displayed on the GUI 208. The navigations buttons 206a-206d have various implementations dependent upon the specific operating system stored on the mobile device 200. In some implementations, the navigation button 206a provides a "previous" function that returns the current state of the GUI 208 to a previous state of the GUI 208; the navigation button 206b provides a menu function; the navigation button 206c provides a home function that brings the GUI 208 to a "home screen;" and the navigation button 206d provides a searching function.

In some implementations, the mobile device 200 can execute an application marketplace application. The application marketplace application can be provided as a client-side application that enables communication with an application marketplace that is provided as a back-end application (e.g., executed on one or more server systems). The application marketplace application provides a listing of applications to the user that are available for download to and installation on the mobile device 200. Specifically, the user selects the application marketplace application by navigating the GUI 208. The user can select the application marketplace application (e.g. launch the application marketplace application for execution) by any means provided by the operating system stored on the mobile device 200. Upon the user selecting the application marketplace application, the GUI 208 can include an application interface 210 displaying a welcome screen of the application marketplace. The welcome screen of the GUI 208 can include a default listing of applications. The default listing of applications can include, for example, the top-most searched applications, or the top-most installed applications.

Further, the welcome screen can include a listing of categories of applications (e.g., news, books, entertainment). An application can be selected from any listing of applications, or otherwise, however presented on the GUI 208.

The welcome screen of the application interface 210 can also include a trending applications category of applications. The user can select the trending applications category. Upon selection of the trending applications category, the application marketplace application provides an update to the application interface 210 to display the listing of trending applications.

The application interface 210 includes a heading portion 212 and an application listing 214. The heading portion 212 includes a title (or category) of applications that are listed in the application listing 214 (e.g., "featured" applications.) The application listing 214 includes applications 216 that are identified by the application marketplace as trending. The application listing 214 further includes application-specific information for each application 216. The application-specific information can include, for example, an application name 218, an application developer 220, an application icon 222, a pricing 224 and a rating 226. The pricing 224 can reflect whether an application 216 is a free application or a paid application. If the application 216 is paid, the pricing 224 can include an identifier of the price (e.g., "U.S. $2.99"). In some implementations, the rating 226 is a rating average provided by multiple users across multiple computing devices (e.g., computing devices 102 of FIG. 1).

The application listing 214 can be provided as a scrollable list. The user of the mobile device 200 can scroll the application listing 214 vertically such that the application listing 214 reveals additional applications 216 while hiding a portion of the currently displayed applications 216.

Figure 3:
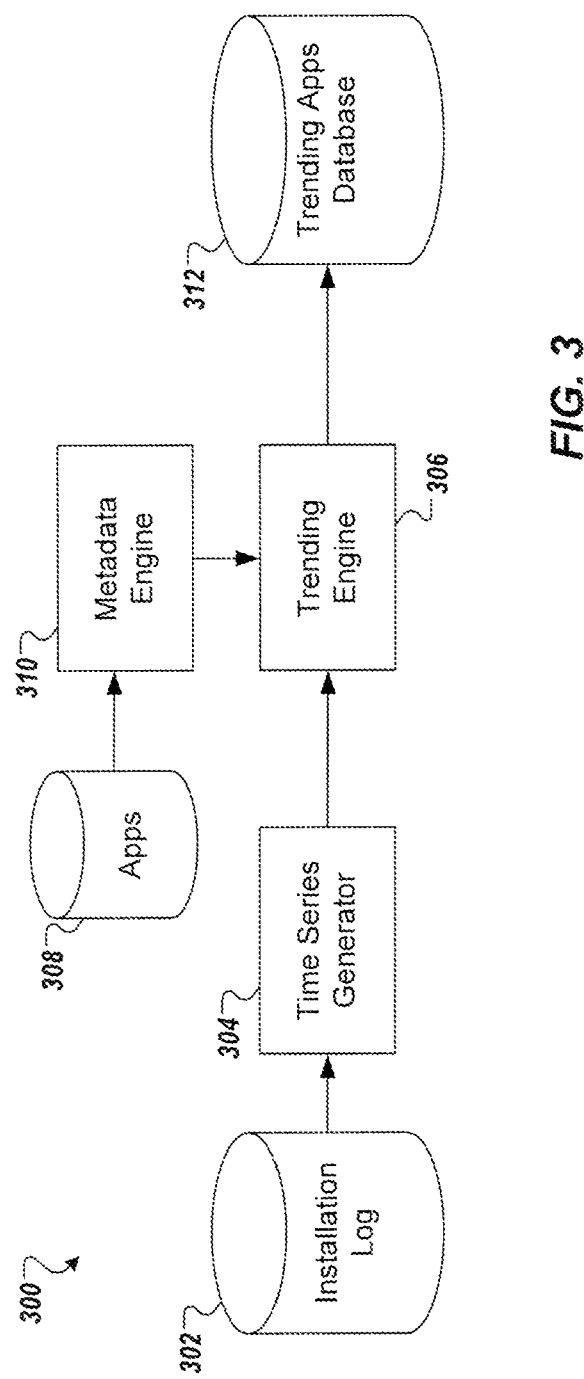
FIG. 3 is a block diagram of a system that includes example components for identifying trending applications.

FIG. 3 is a block diagram of a system 300 that includes example components for generating a list of trending applications. The system 300 includes an installation log database 302, a time series generator 304, a trending engine 306, an applications database 308, a metadata engine 310 and a trending applications database 312.

The installation log database 302 includes installation information relating to installation histories of an initial index of applications available in the application marketplace. The installation information includes, for example, for each application available from the application marketplace, a number of installations, uninstallations and updates of the application across each computing device (such as the computing devices 102 of FIG. 1) that accesses the application marketplace. In some implementations, the installation information of each application relates to a subset of the computing devices that access the application marketplace. In some implementations, the information can be provided on a per device and/or per locale (e.g., country) basis. For example, the information can include a number of installations, uninstallations and updates of the application for a particular device and/or a particular locale. The installation information can further include a time that each installation, uninstallation and/or update of each application occurred.

The installation log database 302 provides the installation information of the initial index of applications to the time series generator 304. In some implementations, the installation log database 302 provides a portion of the installation information to the time series generator 304. Specifically, the applications in the application marketplace can be grouped along differing criteria such as category (e.g., Finance or News), device type (e.g., smartphone, tablet personal computer, a laptop personal computer), and the like. When a criteria is selected, only installation information relating to applications of the selected criteria is provided by the installation log database 302. For example, only installation information relating to applications having the category "Finance" are provided to the time series generator 304. In another example, only installation information relating to applications that are executed on tablet personal computers is provided to the time series generator 304. As still another example, only installation information relating to applications installed on a particular device and/or within a particular locale is provided.

The time series generator 304 can be provided as a computer program that is executed using one or more computing devices (e.g., the server system 104 of FIG. 1). The time series generator 204 receives the installation information from the installation log database 302. The time series generator 304 generates a time series for each application of the initial index of applications. The time series includes, for each application, a number of installations, uninstallations and/or updates for each day over a predetermined number of days. The predetermined number of days can be provided as one of various numbers of days (e.g., 7 days, 14 days). The time series generator 304 provides the time series for the initial index of applications to the trending engine 306.

The applications database 308 stores application information corresponding to the applications available for download to and installation on computing devices (e.g., the mobile device 200 of FIG. 2). The applications database 308 provides the application information to the metadata engine 310. The metadata engine 310 can be provided as a computer program that is executed using one or more computing devices (e.g., the server system 104 of FIG. 1). The metadata engine 310 processes this information to provide relevant metadata corresponding to each application. The metadata can include, for example, application title, application description, developer name, rating, the price, category, whether an application is of a particular content (e.g., adult), and the like. The metadata engine 310 provides the metadata of the applications to the trending engine 306.

The trending engine 306 can be provided as a computer program that is executed using one or more computing devices (e.g., the server system 104 of FIG. 1). The trending engine 306 receives the time series for the initial index of applications from the time series generator 304 and the metadata for the applications from the metadata engine 310. The trending engine 306 can filter a subset of the applications to remove the subset of applications from the initial index of applications. In some implementations, the trending engine 306 filters the subset of applications prior to the time series generator 304 generating the time series.

In some implementations, the trending engine 306 can filter the initial index of applications in view of the metadata received from the metadata engine 310 to provide a filtered initial index of applications. Specifically, a filter can be applied to remove applications from the initial index of applications based on the content of the applications. The application content can include adult content, for example. The trending engine 306 filters the initial index of applications to remove applications related to this particular content. If the trending engine 306 determines that an application of the initial index of applications corresponds to the particular content (e.g., adult content), the application is filtered (e.g., removed) from the initial index of applications. As a note, although an application marketplace can exclude applications including pornographic content, applications including content that may be deemed to be adult (e.g., applications including content related to lingerie, and/or content related to erotic novels) can still be available from the application marketplace.

The trending engine 306 can filter the initial index of applications in view of the time series received from the time series generator 304. Specifically, as mentioned above, the time series includes, for each application in the initial index of applications, a number of installations, uninstallations and/or updates for each day over a predetermined number of days (e.g., 7 days). The trending engine 306 can filter the applications to remove applications that have less than a minimum number of installations. Specifically, the trending engine 306 compares the number of installations of each application to a threshold number of installations. If the number of installations of an application is less than the threshold number of installations, the trending engine 306 removes the application from the initial index of applications.

In some implementations, the subset of applications can be filtered from the initial index of applications after generating the index of trending applications, detailed further below.

The trending engine 306 processes the time series for the filtered initial index of applications and generates a trending score for each application of the filtered initial index of applications. The trending score of an application is based on a total acceleration of the application and a fractional volume of the application. In some implementations, the total acceleration of the application is provided as a summation of two or more accelerations of the application over a period of time. In some implementations, the fractional volume of the application is provided as a percentage of the number of installations of the application compared to the total number of installations of all applications within the application marketplace.

To calculate the total acceleration, the trending engine 306 determines an acceleration of the application for each time period of the predetermined time period (e.g., each day of the previous 7 days). The acceleration (A) can be defined as a change (an increase or a decrease) of a rate of change (R) in the total number of installations (N) of the application for a time period (P) (e.g., each day). The rate of change is the first order derivative of the time series. The total number of installations for the application over the time period can be determined based on the following relationship:

$$N_i = I_i - U_i + W_i$$

where $I_i$ indicates the number of installations of the application for the time period (i); $U_i$ indicates the number of uninstallations of the application for the time period (i); and $W_i$ indicates the number of updates of the application for the time period (i). In some implementations, the time period (i) includes one day (i.e., 24 hours). By way of non-limiting example, if the predetermined time period is provided as 7 days, a total number of installations is calculated for each of the 7 days to provide seven total number of installation values (i.e., $N_i, N_{i-1}, \ldots N_{i-6}$).

The rate of change (R) of the total number of installations can be determined based on the following relationship:

$$R_i = N_i - N_{i-1}$$

where $N_i$ is the total number of installations of the application over the time period (i) and $N_{i-1}$ is the total number of installations over the previous time period (i−1).

The trending engine 306 can determine the acceleration (a) of the application between two rates of change. Specifically, the acceleration of the application is defined as the change in the rate of change (R) in the total number of installations (N) of the application for a time period (i) (e.g., each day). The acceleration is the second order derivative of the time series.

The acceleration for the application over the time period can be determined based on the following relationship:

$$a_i = R_i - R_{i-1}$$

where $R_i$ is the rate of change over the time period (i) and $R_{i-1}$ is the rate of change over the previous time period (i−1).

The trending engine 306 can filter applications based on monotonicity constraints. For example, the trending engine 306 can check that each application has no decreasing number of installations during the last n days (e.g., n=3) and only p days of decreasing numbers of installs for the last m days (e.g., p=1 and m=7). In some implementations, the trending engine 306 can filter applications having one or more negative accelerations during the predetermined time. For example, within the predetermined time period, any applications having consecutive negative accelerations can be filtered out, not being deemed to be trending applications. As another example, any applications having a decreasing acceleration within a specified time period (e.g., the last 3 days) of the predetermined time period can be filtered out, not being deemed to be trending applications. Combinations of these filtering techniques can also be applied.

The trending engine 306 can filter an application from consideration based on a number of ratings of the application and/or an average rating of the application. For example, if a number of ratings of the application is below a threshold number of ratings, the application is removed from consideration. As another example, if an average rating of the application is below a threshold average rating, the application is removed from consideration.

The trending engine 306 calculates the total acceleration ($a_{TOTAL}$) for each of the remaining applications over the predetermined time period (e.g., 7 days). Specifically, the trending engine 306 calculates a summation of the each acceleration (e.g., each acceleration between consecutive days) over the predetermined time period (e.g., 7 days) to define a total acceleration of the application. The total acceleration for the application over predetermined amount of time can be determined based on the following relationship:

$$a_{TOTAL} = \lambda_i(a_i) + \lambda_{i-1}(a_{i-1}) + \ldots + \lambda_{i-z}(a_{i-z})$$

where z is equal to the predetermined time period minus 1. By way of non-limiting example, if the predetermined time period is 7 days, z is equal to 6. A decay factor ($\lambda$) can be provided to decrease the impact of time periods further back in time on the calculation of $a_{TOTAL}$. By way of non-limiting example, $\lambda_i$ can be set equal to one, such that the acceleration $a_i$ is not weighted, while $\lambda_{i-1}$ to $\lambda_{i-z}$ include decreasing values that are less than one. In this manner, $\lambda_i$ has the greatest impact and $\lambda_{i-z}$ has the least impact on the calculation of $a_{TOTAL}$.

The trending engine 306 calculates the fractional volume ($V_F$) of each application as a percentage of the number of installations ($N_F$) of the application compared to the total number of installations ($N_T$) of all applications within the application marketplace (e.g., a fractional volume). The fractional volume can be determined based on the following relationship:

$$V_F = N_F/N_T$$

In some implementations, the fractional volume of the application is a percentage of a subset of applications of the total application marketplace. For example, the subset of applications can include similar (or related) applications to the application. In another example, the subset of applications can include applications having the same category as the application.

The trending engine 306 generates the trending score (T) for each application based on the total acceleration ($a_{TOTAL}$) and the fractional volume ($V_F$) of the application. The trending score can be determined as follows:

$$T = a_{TOTAL} \times V_F$$

The trending engine 306 can generate the trending score for each application in the application marketplace. In some implementations, the trending engine 306 generates the trending score for each application of a subset of applications in the application marketplace (e.g., applications relating to the installation information provided by the installation log database 302, applications not filtered based on the application metadata). The trending engine 306 generates an index of trending applications based on the trending scores of each application. In some implementations, the index of trending applications can include a ranking of the applications based on the trending scores of the applications. For example, the higher a trending score of an application, the higher the application is ranked in the index of trending applications.

In some implementations, the trending score for each application can be compared to a threshold trending score. If the trending score is greater than or equal to the threshold trending score, the trending engine 306 deems that the application is a trending application and the application is included in the index of trending applications. If the trending score is less than the threshold trending score, the trending engine 306 does not deem the application to be a trending application and the application is not included in the index of trending applications.

The trending engine 306 provides the index of trending applications to the trending applications database 312. The trending applications database 312 stores the index of trending applications. The trending applications database 312 makes the index of trending applications available to the application marketplace. The system 300 can intermittently update the index of trending applications (e.g., every 6, 12 or 24 hours).

Figure 4:
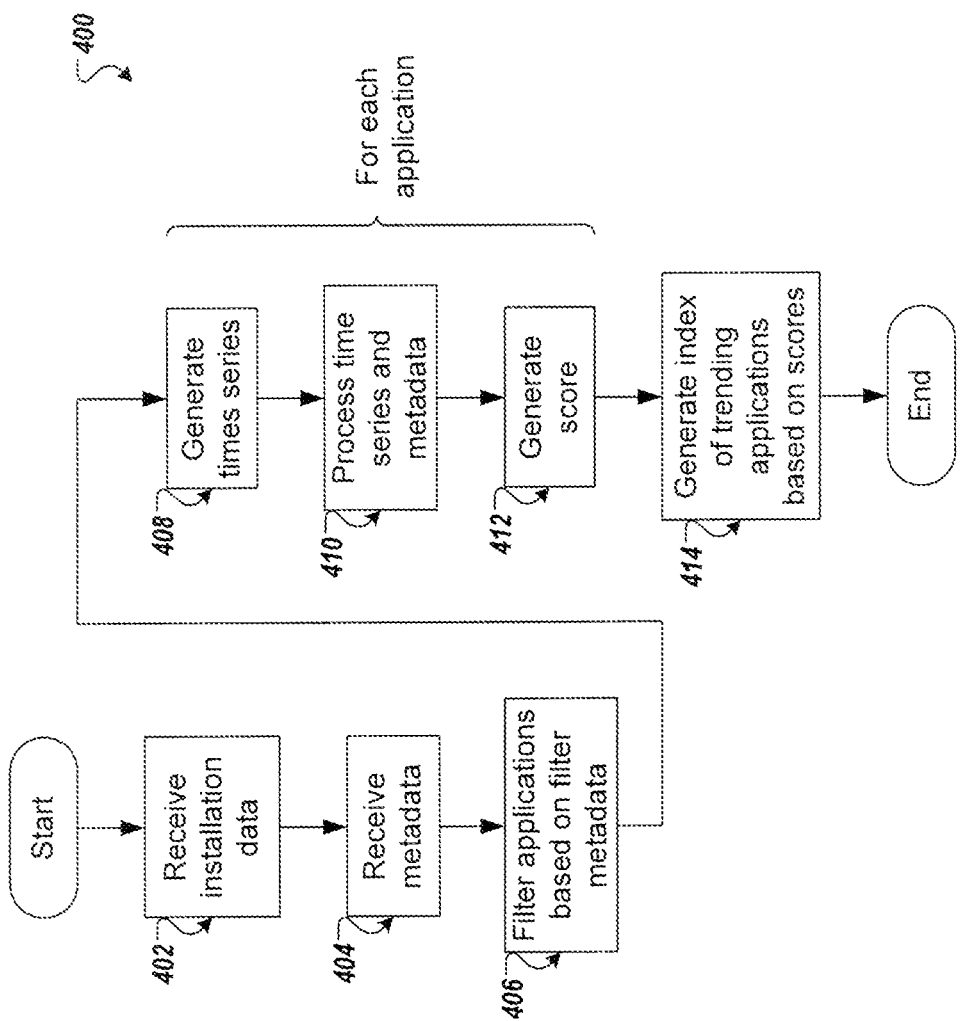
FIG. 4 is a flowchart of an example process that can be executed in accordance with implementations of the present disclosure.

FIG. 4 is a flowchart of an example process 400 that can be executed in accordance with implementations of the present disclosure. The example process 400 can be executed using one or more computing devices (e.g., the server system 104 of FIG. 1).

Installations data is received (402). For example, the server system 104 of FIG. 1 receives installation data. In some implementations, the installation data can be retrieved from computer-readable memory (e.g., from the database 112 of FIG. 1). The installation data corresponds to one or more applications that can be installed and executed on mobile computing devices. Metadata corresponding to each of the one or more applications is received (404). For example, the server system 104 of FIG. 1 receives the metadata for each of the applications. As discussed above, the metadata can include, for example, application title, application description, developer name, rating, the price, category, whether an application is of a particular content (e.g., adult), and the like.

Applications can be filtered from consideration based on filter metadata (406). For example, the server system 104 of FIG. 1 filters applications from consideration as possible trending applications based on filter metadata of the metadata. As discussed above, applications including particular content can be filtered from consideration. As also discussed above, applications having a total number of installations that is less than a threshold number of installations can be filtered from consideration.

For each application, a time series is generated (408), the time series and the metadata are processed (410) and a trending score is calculated (412). For example, the server system 104 of FIG. 1 can generate the time series, can process the time series and the metadata and can generate a trending score for each application, using the techniques described herein. An index of trending applications is generated based on the trending scores (414) and the index can be stored to computer-readable memory. For example, the index of trending applications can be generated by the server system 104 of FIG. 1. The index of trending applications can be generated by comparing the trending score of each application to a threshold trending score, as discussed above. As also discussed above, applications can be filtered from inclusion as trending applications based on a number of negative accelerations within the predetermined time period.

Figure 5:
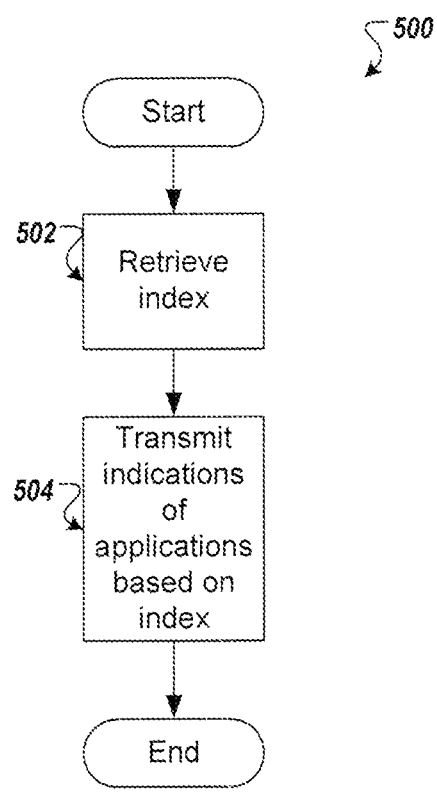
FIG. 5 is a flowchart illustrating an example process for displaying trending applications.

FIG. 5 is a flowchart illustrating an example process for displaying trending applications. The example process 500 can be executed using one or more computing devices. For example, one or more server systems (e.g., the server system 104 of FIG. 1) can be used to execute the example process 500.

An index of trending applications is retrieved (502). The index of trending applications can be available from an application marketplace. Transmit indications of one or more applications for display based upon the index of trending applications (504). The indications of the one more applications for display can be made through the display of the application marketplace on a mobile device (e.g., the mobile device 200), such as when viewing applications offered through the application marketplace on the mobile device (e.g., the mobile device 200).

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A system comprising:
one or more computers; and
a computer-readable storage device coupled to the one or more computers having instructions stored thereon which, when executed by the one or more computers, cause the one or more computers to perform operations comprising:
receiving installation data, the installation data corresponding to one or more applications that can be installed and executed on mobile computing devices, the installation data including a number of installation of each of the one or more applications;
receiving metadata corresponding to each of the one or more applications;
for each application:
generating a time series based on the number of installations;
processing the time series and the metadata to identify a value representing an acceleration of installations of the application over a time period of the time series;
calculating a score based on the value, wherein for each application, the score is based on a fractional installation volume of the application;
comparing the score to a threshold score; and
adding the respective application to an index of trending applications based on the score being greater than or equal to the threshold score.

2. The system of claim 1, wherein each time series comprises the number of installations per time period for a predetermined number of time periods.

3. The system of claim 2, wherein the time period is one day and the predetermined number of time periods totals one week.

4. The system of claim 2, wherein processing the time series comprises applying decay factors to modify impacts of time periods in calculating the score.

5. The system of claim 1, wherein the score is based on a second-order derivative of the time series.

6. The system of claim 1, wherein the fraction installation volume is determined based on a total number of installations of all application.

7. The system of claim 1, wherein the operations further comprise filtering applications from inclusion in the index of trending applications based on the metadata.

8. The system of claim 7, wherein the filtering is executed prior to generating, processing and calculating for each application.

9. The system of claim 1, wherein the operations further comprise filtering applications from inclusion in the index of trending applications based on the number of installations.

10. The system of claim 9, wherein a particular application of the applications is filtered when an associated number of installations is less than a threshold number of installations.

11. The system of claim 9, wherein the filtering is executed prior to generating, processing and calculating for each application.

12. The system of claim 1, wherein the operations further comprise filtering one or more applications from inclusion in the index of trending applications based on the values representing the accelerations of the one or more applications over a predetermined time period.

13. The system of claim 12, wherein a particular application of the one or more applications is filtered when a consecutive number of negative values representing the acceleration within the predetermined time period is greater than a threshold number of negative values representing the acceleration.

14. The system of claim 12, wherein a particular application of the one or more applications is filtered when one or more negative values representing the acceleration occur within a specified sub-period of the predetermined time period.

15. The system of claim 1, wherein the operations are periodically executed to periodically update the index of trending applications.

16. The system of claim 1, wherein the installation data further comprises a number of uninstallations and a number of updates for each application.

17. A computer storage medium encoded with a computer program, the program comprising instructions that when executed by one or more computers cause the one or more computers to perform operations comprising:
receiving installation data, the installation data corresponding to one or more applications that can be installed and executed on mobile computing devices;
receiving metadata corresponding to each of the one or more applications;
for each application:
generating a time series based on the number of installations;
processing the time series and the metadata to identify a value representing an acceleration of installations of the application over a time period of the time series;
calculating a score based on the value, wherein for each application, the score is based on a fractional installation volume of the application;
comparing the score to a threshold score; and
adding the respective application to an index of trending applications based on the score being greater than or equal to the threshold score.

18. A computer-implemented method comprising:
receiving installation data, the installation data corresponding to one or more applications that can be installed and executed on mobile computing devices;
receiving metadata corresponding to each of the one or more applications;
for each application:
generating a time series based on the number of installations;

processing the time series and the metadata to identify a value representing an acceleration of installations of the application over a time period of the time series;

calculating a score based on the value, wherein for each application, the score is based on a fractional installation volume of the application;

comparing the score to a threshold score; and adding the respective application to an index of trending applications based on the score being greater than or equal to the threshold score.

19. The computer-implemented method of claim 18, wherein each time series comprises the number of installations per time period for a predetermined number of time periods.

* * * * *